United States Patent
Tsengas

(10) Patent No.: US 6,237,538 B1
(45) Date of Patent: May 29, 2001

(54) PET TOY BALL FEEDER

(75) Inventor: Steven Tsengas, Mentor, OH (US)

(73) Assignee: Napro, Inc., Fairport Harbor, OH (US)

( * ) Notice: Subject to any disclaimer, the term of this patent is extended or adjusted under 35 U.S.C. 154(b) by 0 days.

(21) Appl. No.: 09/158,714

(22) Filed: Sep. 22, 1998

(51) Int. Cl.$^7$ ............................................. A01K 15/02
(52) U.S. Cl. ............................... 119/707; 119/710
(58) Field of Search .............................. 119/707, 702, 119/708, 709, 710, 711; 446/168; 473/569, 594, 604

(56) References Cited

U.S. PATENT DOCUMENTS

| | | |
|---|---|---|
| 848,136 | 3/1907 | Smith . |
| 996,458 | 6/1911 | Coleman . |
| 1,006,182 | 10/1911 | Cousin . |
| 1,022,112 * | 4/1912 | Smith . |
| 1,031,095 | 7/1912 | Smith . |
| 1,258,464 | 3/1918 | Riley . |
| 1,513,773 | 11/1924 | Thompson . |
| 1,534,964 * | 4/1925 | Kahnweiler . |
| 1,789,333 * | 1/1931 | Da Costa . |
| 2,086,631 * | 7/1937 | Munro . |
| 2,219,154 | 10/1940 | Wahlberg ............................ 273/146 |
| 2,504,650 | 4/1950 | Chressrown ........................... 35/35 |
| 3,874,663 | 4/1975 | Kahle ................................ 273/26 R |
| 4,391,224 | 7/1983 | Adler ................................. 119/29 |
| 4,609,196 | 9/1986 | Bozinovic ........................ 273/128 A |
| 4,756,530 | 7/1988 | Karman ............................. 273/113 |
| 5,009,193 * | 4/1991 | Gordon ............................... 119/711 |
| 5,343,828 * | 9/1994 | Houghton et al. ................. 119/51.03 |
| 5,611,541 | 3/1997 | Paino ................................. 273/317 |
| 5,778,825 * | 7/1998 | Krietzmen et al. ................ 119/708 |
| 5,819,690 * | 10/1998 | Brown ............................... 119/707 |
| 5,865,147 * | 2/1999 | Rubin ................................ 119/711 |
| 5,870,971 * | 2/1999 | Krietzman et al. ................ 119/707 |

* cited by examiner

Primary Examiner—Charles T. Jordan
Assistant Examiner—Yvonne R. Abbott
(74) Attorney, Agent, or Firm—Oldham & Oldham Co., LPA

(57) ABSTRACT

A pet ball toy feeder which is formed from two (2) hollow semi-spherical halves, each hollow semi-spherical half member including a hook member extending inwardly from its inside wall for anchoring an elastic member, such as a rubber band, which is attached to each hook member to normally retain the two (2) hollow semi-spherical half members together in a spherical ball configuration, but permits the two (2) hollow semi-spherical half members to be pulled apart or separated to allow pet treats or pet food to be placed inside the pet toy ball feeder. In a second preferred embodiment of a pet toy ball feeder in accordance with the present invention, the two (2) hollow semi-spherical half members are joined together by snapping resilient flexible projections outwardly extending from one or both of the two (2) hollow semi-spherical half members into one or more corresponding grooves in the other of the two (2) hollow semi-spherical half members. The pet toy ball feeder also includes one or more openings which are slightly larger than the pet treats or pet food to facilitate pet treats or pet food randomly dropping through the one or more openings as the pet toy ball feeder is rolled along a surface by a pet playing with the pet toy ball feeder.

9 Claims, 2 Drawing Sheets

PET TOY BALL FEEDER

BACKGROUND AND SUMMARY OF THE INVENTION

The present invention relates generally to new and novel improvements in a pet toy ball feeder. More particularly, the present invention relates to a pet toy ball feeder for use by pets which is durable and lightweight, economical to fabricate, easy to assemble and provides pets with exercise and enjoyment.

Pets, such as cats, dogs, ferrets, rabbits, hamsters and others, which spend the majority of their time indoors are becoming increasingly popular. In addition, due to the increasingly busy schedules of their owners, such pets are spending an increasing amount of time alone indoors when their owners are not present. While having healthy and happy pets is an objective of virtually every pet owner, the ability of pet owners to exercise and play with their pets is sometimes limited due to a lack of time and energy on behalf of the pet owner.

Many different devices have been developed to assist pet owners in keeping their pets happy and healthy. Such devices can be seen in numerous pet stores and catalogs. Different types of balls, bones and other such toys can be purchased by the owner to be used by their pets for exercise and enjoyment. However, pets tend to quickly lose interest in such devices and thus, the pets do not benefit from exercise and enjoyment from such devices when they are not used by the pets. In contrast, the pet toy ball feeder in accordance with the present invention periodically provides a reward in the form of pet treats or pet food to encourage pets to continue to play with the pet toy ball feeder and thus receive benefit from exercise and enjoyment from playing with the pet toy ball feeder for longer and more frequent periods of time.

Accordingly, an object of the present invention is the provision of a pet toy ball feeder which is durable and lightweight and can be readily assembled.

Another object of the present invention is to provide a pet toy ball feeder which periodically rewards the user with a reward in the form of pet treats or pet food to encourage pets to play with the pet toy ball feeder for longer and more frequent periods of time.

These and other objects of the present invention are attained by a pet toy ball feeder which is formed from two (2) hollow semi-spherical half members, each hollow semi-spherical half member including a hook member extending inwardly from its inside wall for anchoring an elastic member, such as a rubber band, which is attached to each hook member to normally retain the two (2) hollow semi-spherical half members together in a spherical ball configuration, but permits the two (2) hollow semi-spherical half members to be pulled apart or separated to allow pet treats or pet food to be placed inside the pet toy ball feeder. In a second preferred embodiment of a pet toy ball feeder in accordance with the present invention, the two (2) hollow semi-spherical half members are joined together by snapping resilient flexible projections outwardly extending from one, or both, of the two (2) hollow semi-spherical half members into one or more corresponding grooves in the opposite of the two (2) hollow semi-spherical half members. The pet toy ball feeder also includes one or more openings which are slightly larger than the pet treats or pet food to facilitate pet treats or pet food randomly dropping through the one or more openings as the pet toy ball feeder is rolled along a surface by a pet playing with the pet toy ball feeder.

DETAILED DESCRIPTION OF THE DRAWINGS

Figure 1:
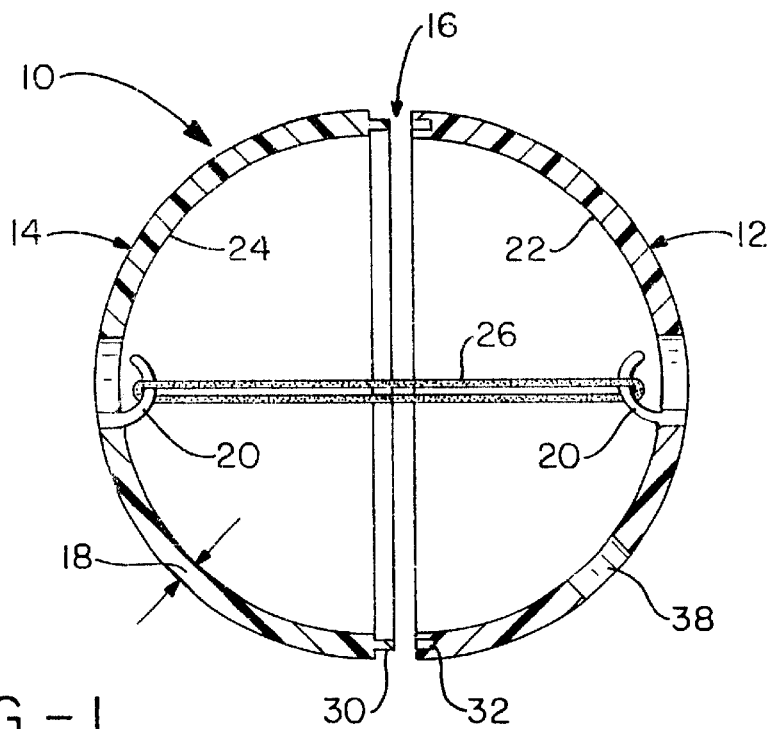
FIG. 1 is a cross-sectional side view of a pet toy ball feeder in accordance with a first preferred embodiment of the present invention with the two (2) hollow semi-spherical half members separated.

In the following detailed description of a first preferred embodiment and a second preferred embodiment of the present invention, reference is made to the accompanying drawings which, in conjunction with this detailed description, illustrate and describe a first preferred embodiment and a second preferred embodiment of a pet toy ball feeder in accordance with the present invention. Referring now to the drawings, in which like-referenced characters represent corresponding elements throughout the several views, attention is first directed to FIG. 1 and FIG. 2, which illustrate cross-sectional side views of a first preferred embodiment of a pet toy ball feeder in accordance with the present invention, generally identified by reference number 10. Pet toy ball feeder 10 includes first hollow semi-spherical half member 12 and second semi-spherical half member 14 brought together at seam 16. Pet toy ball feeder 10 is intended for use by pets, such as cats, dogs, ferrets, rabbits and hamsters, and thus pet toy ball feeder 10 is manufactured to withstand substantial force from such pets without breaking. This is preferably achieved by increasing wall thickness 18 and manufacturing first hollow semi-spherical half member 12 and second hollow semi-spherical half member 14 from a material that can withstand substantial forces such as polycarbonate, polyvinyl chloride, rubber or other plastic or polymer materials known in the art as accomplishing the purposes of the invention. Pet toy ball feeder 10 can be manufactured in different diameters in a range of, for example, from one (1) inch to twelve (12) inches to accommodate the differences in size among pets. In addition, pet toy ball feeder 10 can be made in a variety of colors, including clear, opaque and translucent colors. The preferred diameter of pet toy ball feeder 10 to be used by cats, small dogs, ferrets and rabbits is approximately two (2) inches and pet toy ball feeder 10 is preferably fabricated from a translucent material.

Figure 2:
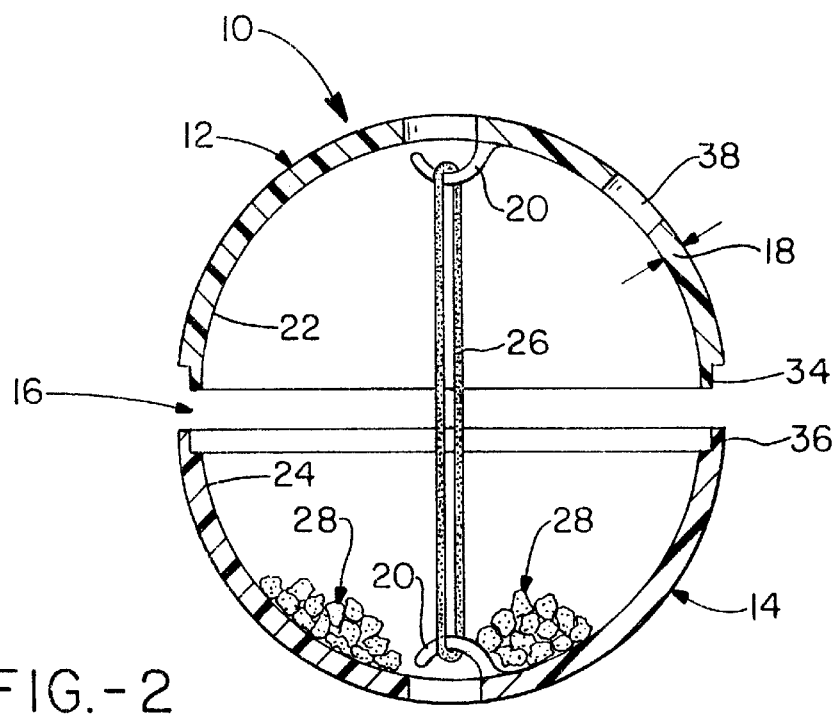
FIG. 2 is a second cross-sectional side view of the first preferred embodiment of a pet toy ball feeder shown in FIG. 1 with the two (2) hollow semi-spherical half members partially open.

Referring now to FIG. 1, each of first hollow semi-spherical half member 12 and second semi-spherical half member 14 includes hook member 20 extending inwardly from inside walls 22 and 24, respectively, for anchoring flexible element 26, such as a rubber band or some other elastic member that preferably does not have a significant memory. Flexible element 26 is attached to each hook member 20 which normally retains first hollow semi-spherical half member 12 and second hollow semi-spherical half member 14 in a spherical ball configuration. However, flexible element 26 is capable of being stretched, thus pulling first hollow semi-spherical half member 12 and second hollow semi-spherical half member 14 apart to allow pet treats or pet food 28 to be placed inside pet toy ball feeder 10.

Hook members 20 can be either integrated integrally into first hollow semi-spherical half member 12 and second hollow semi-spherical half member 14 or can be separate parts which are affixed to first hollow semi-spherical half member 12 and second hollow semi-spherical half member 14 by, for example, an adhesive after first hollow semi-spherical half member 12 and second hollow semi-spherical half member 14 have been fabricated. As a possible alternative, first hollow semi-spherical half member 12 and second hollow semi-spherical half member 14 could include corresponding threads at seam 16 to allow first hollow semi-spherical half member 12 and second hollow semi-spherical half member 14 to be removably joined together by engaging the corresponding threads in first hollow semi-spherical half member 12 and second hollow semi-spherical half member 14 together into a spherical ball configuration without hook members 20 or flexible element 26.

As assembled, first hollow semi-spherical half member 12 and second hollow semi-spherical half member 14 are joined together at seam 16. Seam 16 may have a tongue 30 and groove 32 configuration, an overlap of outwardly extending projections 34 and 36 on first hollow semi-spherical half member 12 and second hollow semi-spherical half member 14, respectively, or a configuration which allows first hollow semi-spherical half member 12 and second hollow semi-spherical half member 14 to be snapped together by, for example, including a protrusion and a corresponding recess on outwardly extending projection 34 and outwardly extending projection 36.

Pet toy ball feeder 10 also includes one or more openings 38 through first hollow semi-spherical half member 12 and/or second hollow semi-spherical half member 14. One or more openings 38 are preferably slightly larger than pet treats or pet food 28, for example, approximately three eights (⅜) of an inch in diameter or approximately one half (½) of an inch in diameter, to facilitate pet treats or pet food 28 randomly dropping through one or more openings 38 as pet toy ball feeder 10 is rolled along a surface by a pet playing with pet toy ball feeder 10. This provides both mental and physical stimulation for the pet when playing with pet toy ball feeder 10. In addition, for cats in particular, catnip can be placed with or replace pet treats or pet food 28 in pet toy ball feeder 10 to provide a catnip odor which will further stimulate the cat. Furthermore, the number and size of one or more openings 38 can be varied as desired to control the rate at which pet treats or pet food 28 are randomly dropped from pet toy ball feeder 10, thus controlling the rate at which a pet can consume pet treats or pet food 28 and preventing pets from eating too quickly.

Figure 3:
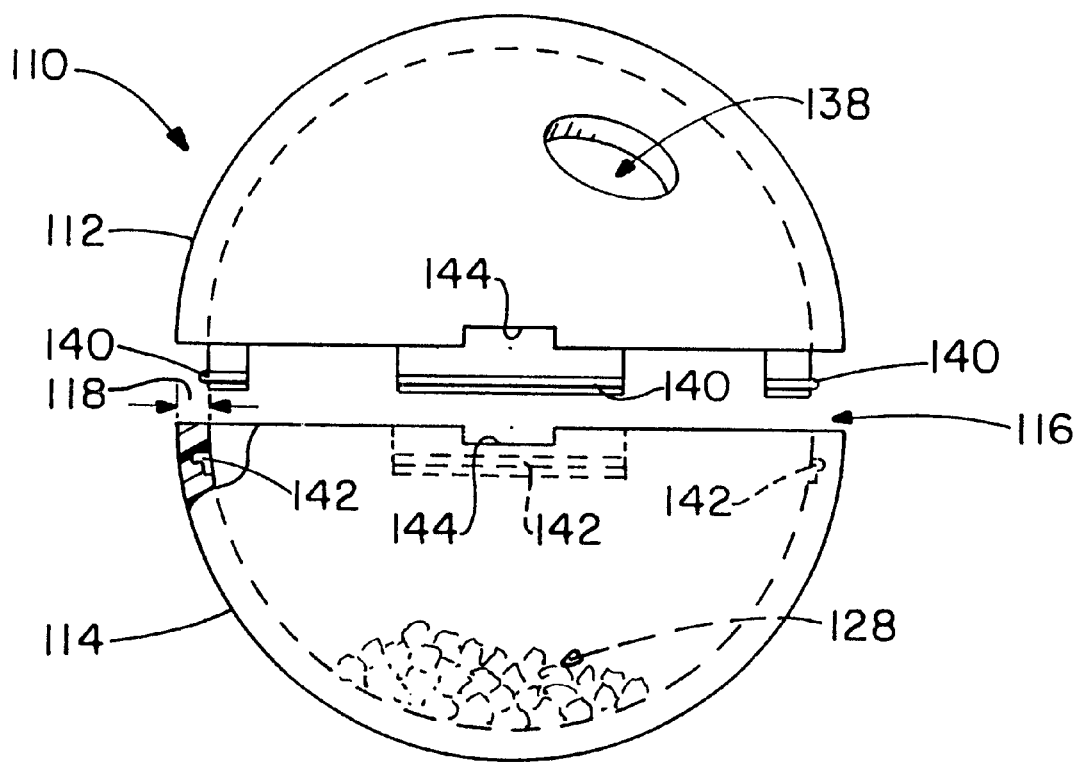
FIG. 3 is a side view, partly in cross-section and partly in plan view, of a pet toy ball feeder in accordance with a second preferred embodiment of the present invention with the two (2) hollow semi-spherical half members separated.

Referring now to FIG. 3, which illustrates a side view, partly in cross-section and partly in plan view, of a second preferred embodiment of a pet toy ball feeder in accordance with the present invention, generally identified by reference number 110, pet toy ball feeder 110 generally includes first hollow semi-spherical half member 112 and second semi-spherical half member 114 brought together at seam 116. Pet toy ball feeder 110 is intended for use by pets, such as cats, dogs, ferrets, rabbits and hamsters, and thus pet toy ball feeder 110 is manufactured to withstand substantial force from such pets without breaking. This is preferably achieved by increasing wall thickness 118 and manufacturing first hollow semi-spherical half member 112 and second hollow semi-spherical half member 114 from a material that can withstand substantial forces such as polycarbonate, polyvinyl chloride, rubber or other plastic or polymer materials known in the art as accomplishing the purposes of the invention. Pet toy ball feeder 110 can be manufactured in different diameters in a range of, for example, from one (1) inch to twelve (12) inches to accommodate the differences in size among pets. In addition, pet toy ball feeder 110 can be made in a variety of colors, including clear, opaque and translucent colors. The preferred diameter of pet toy ball feeder 110 to be used by cats, small dogs, ferrets and rabbits is approximately two (2) inches and pet toy ball feeder 110 is preferably fabricated from a translucent material.

One or both of first hollow semi-spherical half member 112 and second semi-spherical half member 114, in the second preferred embodiment of pet toy ball feeder 110 shown in FIG. 3, first hollow semi-spherical half member 112, includes one (1) or more, and more preferably two (2) or more, resilient flexible projections 140 extending outwardly from seam 116, three (3) such resilient flexible projections 140 being shown in the second preferred embodiment of pet toy ball feeder 110 shown in FIG. 3. Resilient flexible projections 140 correspond to, and are resiliently received in, one or more grooves 142, and most preferably a continuous groove around the circumference of the other of one or both of the first hollow semi-spherical half member 112 and second semi-spherical half member 114, in the second preferred embodiment of pet toy ball feeder 110 shown in FIG. 3, second hollow semi-spherical half member 114, to retain first hollow semi-spherical half member 112 and second hollow semi-spherical half member 114 in a spherical ball configuration. Pet treats or pet food 128 are preferably placed inside pet toy ball feeder 110 prior to snapping first hollow semi-spherical half member 112 and second hollow semi-spherical half member 114 together into its spherical ball configuration.

At least one, and more preferably both, of first hollow semi-spherical half member 112 and second hollow semi-spherical half member 114 includes cutaways 144 and, which are preferably substantially rectangular in configuration, along a portion of the circumference of seam 116 to facilitate the separation of first hollow semi-spherical half member 112 and second hollow semi-spherical half member 114 by, for example, inserting a tip of a screwdriver or a coin, in cutaways 144 and twisting to force resilient flexible projections 140 out of one or more corresponding grooves 142 and cause separation of first hollow semi-spherical half member 112 and second hollow semi-spherical half member 114. It is beneficial to facilitate the separation of first hollow semi-spherical half member 112 and second hollow semi-spherical half member 114 of pet toy ball feeder 110 to allow pet treats or pet food 128 to be placed in the interior of pet toy ball feeder 110 quickly and easily.

Pet toy ball feeder 110 also includes one or more openings 138 through first hollow semi-spherical half member 112 and/or second hollow semi-spherical half member 114. One or more openings 138 are preferably slightly larger than pet treats or pet food 128, for example, approximately three eights (⅜) of an inch in diameter or approximately one half (½) of an inch in diameter, to facilitate pet treats or pet food 128 randomly dropping through one or more openings 138 as pet toy ball feeder 110 is rolled along a surface by a pet playing with pet toy ball feeder 110. This provides both mental and physical stimulation for the pet when playing with pet toy ball feeder 110. In addition, for cats in particular, catnip can be placed with or replace pet treats or pet food 128 in pet toy ball feeder 110 to provide a catnip odor which will further stimulate a cat. Furthermore, the number and size of one or more openings 138 can be varied as desired to control the rate at which pet treats or pet food 128 are randomly dropped from pet toy ball feeder 110, thus controlling the rate at which a pet can consume pet treats or pet food 128 and preventing pets from eating too quickly.

Although the present invention has been described above in detail, the same is by way of illustration and example only and is not to be taken as a limitation on the present invention. For example, the pet toy ball feeder in accordance with the present invention could be fabricated in other shapes, such as in a cube or an elongated football configuration and pet toy ball feeder could be further modified in various ways. Accordingly, the scope and content of the present invention are to be defined only by the terms of the appended claims.

What is claimed is:

1. A pet toy ball feeder for retaining pet treats or pet food and randomly dropping the pet treats or pet food from the pet toy ball feeder as the pet toy ball feeder is rolled along a surface by a pet playing with the pet toy ball feeder, the pet toy ball feeder comprising:

a first hollow semi-spherical half member having a plurality of spaced apart resilient flexible projections extending outwardly therefrom, and a second hollow semi-spherical half member having at least one groove corresponding to the plurality of spaced apart resilient flexible projections and the first hollow semi-spherical half member and the second hollow semi-spherical half member being joined together at a seam by the plurality of spaced apart resilient flexible projections being received in, and resiliently engaging with, the at least one groove to retain the first hollow semi-spherical half member and the second hollow semi-spherical half member in a closed substantially spherical configuration, at least one of the half members including at least one opening therein to facilitate the random dropping of the pet treats or pet food placed therein through the at least one opening as the pet toy ball feeder is rolled along a surface by the pet playing with the pet toy ball feeder.

2. The pet toy ball according to claim 1, further comprising:

means for facilitating the release of one half member from the other half member.

3. The pet toy ball according to claim 2, where the means for facilitating the release of one half member from the other half member comprises at least one half member having a cutaway portion along a portion of a seam.

4. The pet toy ball according to claim 3, wherein the cutaway portion is rectangular.

5. A pet toy ball feeder for retaining pet treats or pet food and randomly dropping the pet treats or pet food from the pet toy ball feeder as the pet toy ball feeder is rolled along a surface by a pet playing with the pet toy ball feeder, the pet toy ball feeder comprising:

a first hollow semi-spherical half member having a plurality of spaced apart resilient flexible projections extending outwardly therefrom; and a second hollow semi-spherical half member having a plurality of spaced apart grooves corresponding to the plurality of spaced apart resilient flexible projections and the first hollow semi-spherical half member and the second hollow semi-spherical half member being joined together at a seam by the plurality of spaced apart resilient flexible projections being received in, and resiliently engaging with, the plurality of spaced apart grooves to retain the first hollow semi-spherical half member and the second hollow semi-spherical half member in a closed substantially spherical configuration, at least one of the half members including at least one opening therein to facilitate the random dropping of the pet treats or pet food placed therein through the at least one opening as the pet toy ball feeder is rolled along a surface by the pet playing with the pet toy ball feeder.

6. The pet toy ball according to claim 5, further comprising:

means for facilitating the release of one half member from the other half member.

7. The pet toy ball according to claim 6, where the means for facilitating the release of one half member from the other half member comprises at least one half member having a cutaway portion along a portion of a seam.

8. The pet toy ball according to claim 7, wherein the cutaway portion is rectangular.

9. A pet toy ball feeder for retaining pet treats or pet food and randomly dropping the pet treats or pet food from the pet toy ball feeder as the pet toy ball feeder is rolled along a surface by a pet playing with the pet toy ball feeder, the pet toy ball feeder comprising:

a first hollow semi-spherical half member having a plurality of spaced apart resilient flexible projections extending outwardly therefrom;

a second hollow semi-spherical half member having a plurality of spaced apart grooves corresponding to the plurality of spaced apart resilient flexible projections and the first hollow semi-spherical half member and the second hollow semi-spherical half member being joined together at a seam by the plurality of spaced apart resilient flexible projections being received in, and resiliently engaging with, the plurality of spaced apart grooves to retain the first hollow semi-spherical half member and the second hollow semi-spherical half member in a closed substantially spherical configuration, at least one of the half members including at least one opening therein to facilitate the random dropping of the pet treats or pet food placed therein through the at least one opening as the pet toy ball feeder is rolled along a surface by the pet playing with the pet toy ball feeder; and means for facilitating the release of one half member from the other half member, the means for facilitating the release of one half member from the other half member comprising at least one half member having a cutaway portion along a portion of a seam.

* * * * *

UNITED STATES PATENT AND TRADEMARK OFFICE
CERTIFICATE OF CORRECTION

PATENT NO. : 6,237,538 B1
DATED : May 29, 2001
INVENTOR(S) : Steven Tsengas

It is certified that error appears in the above-identified patent and that said Letters Patent is hereby corrected as shown below:

Column 1,
Line 5, add -- This application claims the benefit under 35 U.S.C. §119(e) of United States Provisional application Ser. No. 60/088,672, filed June 9, 1998 --.

Signed and Sealed this

Twenty-ninth Day of January, 2002

Attest:

Attesting Officer

JAMES E. ROGAN
Director of the United States Patent and Trademark Office